US008818882B2

(12) United States Patent
Carlson et al.

(10) Patent No.: US 8,818,882 B2
(45) Date of Patent: Aug. 26, 2014

(54) ALIAS IDENTITY AND REPUTATION VALIDATION ENGINE

(75) Inventors: Mark Carlson, Half Moon Bay, CA (US); Patrick Stan, Pacifica, CA (US); Patrick Faith, Pleasanton, CA (US); Benjamin Rewis, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 356 days.

(21) Appl. No.: 12/846,769

(22) Filed: Jul. 29, 2010

(65) Prior Publication Data

US 2011/0047040 A1 Feb. 24, 2011

Related U.S. Application Data

(60) Provisional application No. 61/241,237, filed on Sep. 10, 2009, provisional application No. 61/240,195, filed on Sep. 5, 2009, provisional application No. 61/236,487, filed on Aug. 24, 2009.

(51) Int. Cl.
*G06Q 30/00* (2012.01)

(52) U.S. Cl.
USPC ........... 705/26.35; 705/26.1; 705/38; 705/39; 705/325

(58) Field of Classification Search
USPC .............................. 705/26.35, 325
See application file for complete search history.

(56) References Cited

U.S. PATENT DOCUMENTS

| 5,845,265 A | 12/1998 | Woolston |
| 7,010,518 B1 | 3/2006 | Bedell et al. |
| 7,433,832 B1 | 10/2008 | Bezos et al. |
| 7,464,329 B2 | 12/2008 | Relyea et al. |
| 7,575,177 B2 | 8/2009 | Killian et al. |
| 7,853,614 B2 * | 12/2010 | Hoffman et al. ............... 707/785 |
| 8,131,745 B1 | 3/2012 | Hoffman et al. |
| 8,271,506 B2 * | 9/2012 | Martinez et al. ............... 707/755 |
| 2002/0035543 A1 | 3/2002 | Shedd et al. |
| 2002/0133365 A1 | 9/2002 | Grey et al. |

(Continued)

FOREIGN PATENT DOCUMENTS

| JP | 2009-116457 A | 5/2009 |
| WO | WO 2011-028363 A2 | 3/2011 |

OTHER PUBLICATIONS

Li et al. "A General Object-Oriented Spatial Temporal Data Model," Symposium on Geospatial Theory, Processing and Applications, Ottawa 2002, 6 pages.

(Continued)

*Primary Examiner* — Bradley B. Bayat
(74) *Attorney, Agent, or Firm* — Kilpatrick Townsend & Stockton LLP

(57) ABSTRACT

Methods and system for determining reputation information are provided. The method includes analyzing transactional and non-transactional information for an alias associated with an entity and determining reputation information for that alias. The reputation information is transferable across multiple domains. A user can request the reputation information about an entity prior to doing business with that entity. The reputation information is generated for merchants as well as users. The system can generate transaction risk score for every transaction to be conducted between two or more aliases. The system includes an alias identity and reputation validation server computer that receives inputs from various external systems and generated reputation information based on the inputs. Additionally, every individual user/merchant can manage his profile within the reputation database and enter some information manually.

13 Claims, 9 Drawing Sheets

(56) References Cited

U.S. PATENT DOCUMENTS

| | | | |
|---|---|---|---|
| 2006/0021009 A1 | 1/2006 | Lunt | |
| 2006/0212925 A1 | 9/2006 | Shull et al. | |
| 2008/0005223 A1 | 1/2008 | Flake et al. | |
| 2008/0021761 A1 | 1/2008 | Rable | |
| 2008/0120214 A1 | 5/2008 | Steele et al. | |
| 2008/0126344 A1* | 5/2008 | Hoffman et al. | 707/5 |
| 2008/0270209 A1* | 10/2008 | Mauseth et al. | 705/7 |
| 2009/0006115 A1* | 1/2009 | Schwarz | 705/1 |
| 2009/0070130 A1* | 3/2009 | Sundaresan et al. | 705/1 |
| 2009/0248738 A1* | 10/2009 | Martinez et al. | 707/103 R |
| 2009/0300720 A1* | 12/2009 | Guo et al. | 726/3 |
| 2009/0328173 A1 | 12/2009 | Jakobson et al. | |
| 2010/0043055 A1* | 2/2010 | Baumgart | 726/2 |
| 2010/0114776 A1* | 5/2010 | Weller et al. | 705/44 |
| 2010/0131640 A1* | 5/2010 | Carter | 709/224 |
| 2011/0046969 A1 | 2/2011 | Carlson et al. | |
| 2011/0047076 A1 | 2/2011 | Carlson et al. | |
| 2012/0185942 A1* | 7/2012 | Dixon et al. | 726/24 |

OTHER PUBLICATIONS

Non-Final Office Action for U.S. Appl. No. 12/846,767, mailed on May 11, 2012, 16 pages.

Non-Final Office Action for U.S. Appl. No. 12/846,764, mailed on Jun. 6, 2012, 17 pages.

International Search Report and Written Opinion for PCT Patent Application No. PCT/US2010/044692 mailed on Mar. 29, 2011, 11 pages.

Li et al. "Sources and Monitors: A Trust Model for Peer-to-Peer Networks," Department of Computer Sciences, The University of Texas at Austin, date unavailable, 6 pages.

Fischmann et al. "Data Confidentiality and Reputation Schemes in Distributed Information System," Feb. 4, 2008, 291 pages.

Pichler, "Trust and Reliance—Enforcement and Compliance: Enhancing Consumer Confidence in the Electronic Marketplace," http://www.law.stanford.edu/library/biblio/rufus.pdf, May 2000, 196 pages.

Wolf, "Friction and Trust in Online Markets," The Ohio State University, 2006, 117 pages.

Tiangsoongnern, "An Examination of Perceived Risk and Trust as Determinants of Online Purchasing Behaviour: A Study within the U.S.A. Gemstone Industry," Murdoch University, Mar. 2007, 204 pages.

Audun et al. "A Survey of Trust and Reputation Systems for Online Service Provision. Decision Support Systems," http://eprints.qut.edu.au 43 (2), 2007, 44 pages.

Okita, "A Peer-to-Peer" Reputation System, 2003, 12 pages.

Definition of Reputation, Google Inc., Published Oct. 22, 2012 Available at http://google.com/serch?Q=denine%3Areputation&sourceid=ie7&rls=com.microsoft:IE-SearchBox&ie=&0e= 2 pages.

Final Office Action for U.S. Appl. No. 12/846,764, mailed on Oct. 29, 2012, 23 pages.

Final Office Action for U.S. Appl. No. 12/846,767, mailed on Nov. 2, 2012, 19 pages.

Office Action for Canadian Patent Application No. 2,772,541, mailed on Oct. 9, 2012, 2 pages.

Office Action of Australian Patent Application No. 2010289961, mailed Mar. 5, 2013, 6 pages.

Office Action of Canadian Patent Application No. 2,772,541, mailed May 16, 2013, 4 pages.

* cited by examiner

ALIAS IDENTITY AND REPUTATION VALIDATION ENGINE

CROSS-REFERENCES TO RELATED APPLICATIONS

This application claims benefit under 35 USC §119(e) to U.S. Provisional Patent Application No. 61/236,487 filed Aug. 24, 2009 and entitled "Alias Identity and Reputation Engine", U.S. Provisional Patent Application No. 61/240,195 filed Sep. 5, 2009 and entitled "Alias Hierarchy and Data Services", and U.S. Provisional Patent Application No. 61/241,237 filed Sep. 10, 2009 and entitled "Alias Reputation Interaction System", the disclosures of which are incorporated by reference herein in their entirety for all purposes.

This application is related to U.S. Non-provisional application Ser. No. 12/846,764 entitled "ALIAS REPUTATION INTERACTION SYSTEM" filed on Jul. 29, 2010 and U.S. Non-Provisional application Ser. No. 12/846,767 entitled "ALIAS HIERARCHY AND DATA STRUCTURE", filed on Jul. 29, 2010.

BACKGROUND

In recent years commerce on the Internet has grown exponentially. There are a number of on-line merchants that offer products and services across a variety of areas. There are primarily three types of merchants that do business over the Internet. First, there are companies that operate a website and sell their own products and/or services, e.g., www.apple.com. Second, there are companies that operate a website and resell products and services manufactured by other companies, e.g., www.buy.com. Third, there are online marketplaces where individuals and small businesses can buy and sell products and services, e.g., Amazon, eBay, Craigslist, etc.

One of the major concerns of doing business over the Internet is the anonymity of the buyer and the seller, particularly on the online marketplaces where the bulk of person-to-person transactions occurs. In a traditional brick-and-mortar store, the buyer has some amount of confidence in the seller based on the seller's reputation and history. In that scenario, the buyer can examine the products before purchasing. Many of the brick-and-mortar merchants now offer online versions of their store where one can expect same type of products as in the physical store.

This same sense of trust and security is lacking in the online marketplaces where the merchant is relatively unknown to the buyer and vice versa. To restore some trust in the online marketplaces, many online marketplaces, e.g., eBay and other independent sites like www.yelp.com have developed rating systems where consumers can provide their feedback for a particular merchant based on their experience of dealing with that merchant. A potential buyer can consult the feedback for a merchant prior to doing business with the merchant. Although this system provides some measure of security to the buyer about doing business with a merchant, it suffers from many disadvantages.

First, the consumer feedback is very subjective and often does not reflect a true characterization of the merchant. For example, consumer A may rate a particular merchant poorly based on the fact that a wrong product was shipped to him. However, there is no mechanism to evaluate the reason behind the shipping of the wrong product. For example, the consumer may have ordered the wrong product, later blaming it on the merchant. In this case, a poor rating for a merchant may be unjustified. The merchant on the other hand, cannot keep track of all the negative feedback about him and respond to each feedback. This makes the current merchant rating systems unreliable.

Second, it is easy for a merchant to move across multiple marketplaces undetected to hide his bad reputation. Most of the current rating systems are specific to the online marketplace that they represent and ratings at one marketplace cannot be ported to other marketplaces. For example, merchant A who garners a bad reputation at marketplace A may easily move to marketplace B with a new identity, e.g., merchant B, and the consumers at marketplace B would never know that merchant B is the same entity as merchant A and that he has a bad reputation at marketplace A. This non-portability of reputation information makes it easy for merchants and buyers to mover across multiple domains without being detected.

What is needed is a system than can track merchants and buyers across multiple domains using information that cannot be easily falsified or changed easily. The reputation information about the merchants and buyers can then be easily collected and be made available to potential consumers or merchants, respectively.

SUMMARY

Embodiments of the present invention are related to methods and systems for associating objects with one or more alias, generating an alias hierarchy and data structure, generating reputation information, and using the reputation information in various payment and non-payment transactions.

Some embodiments of the present invention provide a method for conducting a transaction. The method includes receiving a request for providing reputation information about an alias associated with an entity, searching a database to locate reputation information for the alias, and providing the reputation information for the alias, the reputation information including a reputation score.

Some embodiments of the present invention further provide receiving information about a payment device, a computer device, and location associated with the entity, searching the database to check whether there is a second alias whose payment device information, computer device information, and location information matches with the entity's information, and associating the second alias with the entity if the payment device information, the computer device information, and the location information of the second alias match with the payment device information, the computer device information, and the location information of the entity.

Some embodiments of the present invention provide a method for transferring alias reputation information across a plurality of domains using a reputation server computer. The method includes receiving information related to a first alias associated with a first entity, the first entity being coupled to a first domain, calculating a reputation score of the first alias, storing the information related to the first entity and the reputation score of the first alias in a database, receiving a request, from a client system coupled to a second domain, for providing a reputation score for a second alias, determining whether the second alias is associated with the first entity; and providing the reputation score of the first alias to the client system coupled to the second domain, if it is determined that the second alias is associated with the first entity.

Some embodiments of the present invention provide a method for generating reputation information for an alias where the alias is associated with an entity. The method includes receiving payment transaction information related to a first alias associated with a first entity, the payment transaction information including payment transactions performed by the first entity, receiving non-payment transaction information related to the first alias, the non-payment transactions including transaction between the first alias and one or more objects, analyzing the payment transaction information and the non-payment transaction information, associating the one or more objects with the first alias based at least in part on the payment transaction information and the non-payment transaction information, and generating reputation information for the first alias based at least in part on the payment transaction information and the non-payment transaction information related to the first alias and to the one or more objects.

Certain embodiments of the present invention provide a system for generating reputation information for an entity. The system includes a data receiving module configured to receive payment transaction information and non-payment transaction information of an alias associated with an entity, an analysis module configured to analyze the payment transaction information and non-payment transaction information, and associate an object with the alias based at least in part on the payment transaction information and non-payment transaction information, wherein the payment transaction information and non-payment transaction information includes transactions between the alias and the object, a storage module configured to store the association information between the object and the alias, a reputation information generation module configured to receive the association information and generate reputation information for the alias based on the payment transaction information and non-payment transaction information, and a network interface module configured to communicate with one or more external systems to receive the payment transaction information and non-payment transaction information and to send the reputation information.

Other embodiments of the present invention provide a method for creating an alias data structure. The method includes receiving transaction information related to a first alias associated with an entity, receiving transaction information between a first object and the entity, and associating the first object with the first alias based at least in part on the transaction information related to the first alias and transaction information between the first object and the entity.

Some embodiments of the present invention provide a method for managing one or more objects associated with an alias. The method includes receiving input related to a first object associated with a first alias, the input specifying an operation to be performed on the object, performing the specified operation on the object, and updating association information between the first object and the first alias based at least in part on results obtained after performing the specified operation.

The following detailed description, together with the accompanying drawings will provide a better understanding of the nature and advantages of the present invention.

DETAILED DESCRIPTION

Figure 1:
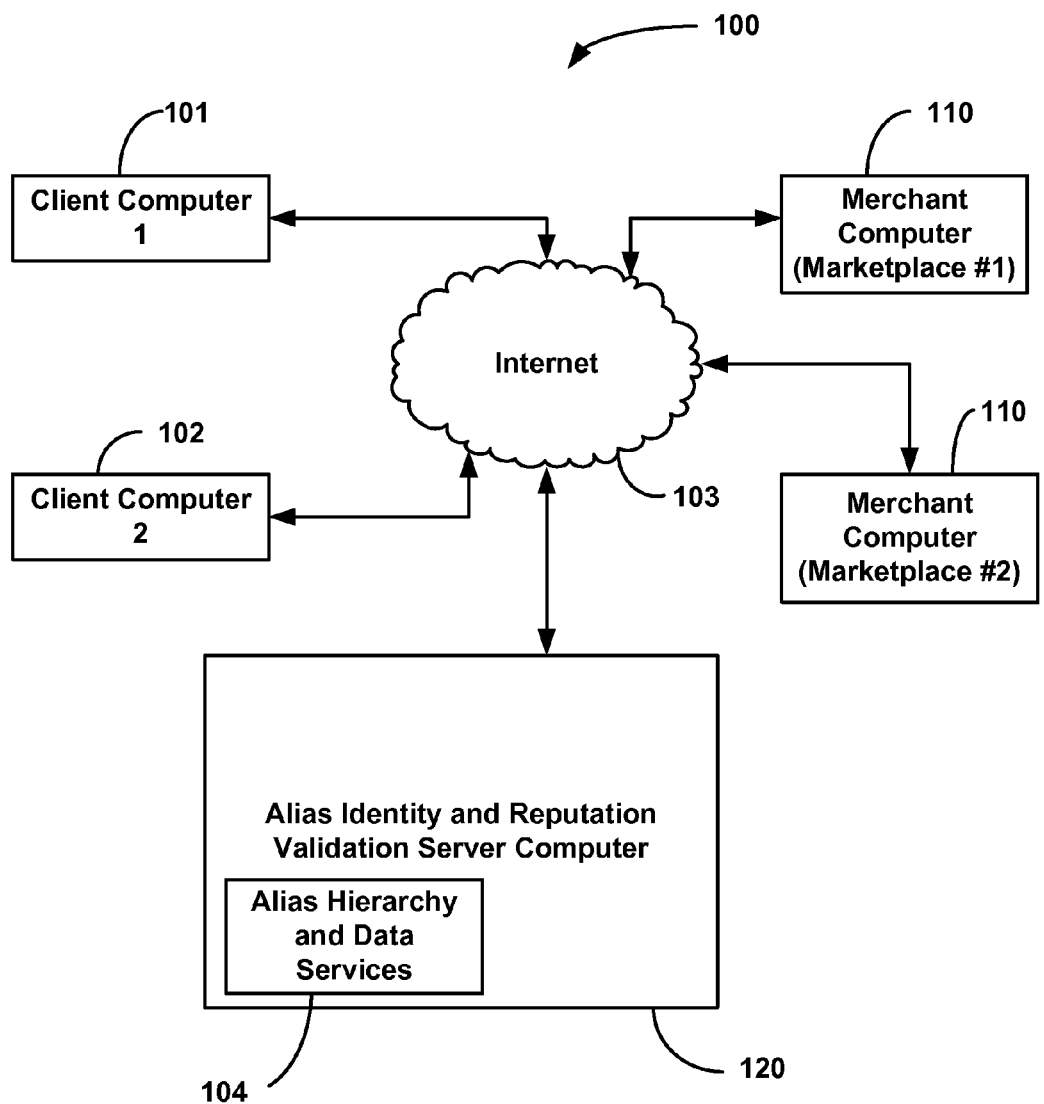
FIG. 1 illustrates a system incorporating an alias identity and reputation validation server computer according to an embodiment of the present invention.

Certain embodiments of the present invention provide a method for conducting a transaction using a computer system. The method includes receiving a request for providing reputation information about an alias associated with an entity, searching a database to locate reputation information for the alias, and providing the reputation information for the alias where the reputation information includes a reputation score.

Reputation information can be any information that indicates the trustworthiness of an entity to do business. For example, reputation information can include data such as number of years in business, yearly revenue, number of repeat customers, refund policy, warranty information, etc.

In some embodiments, the method further includes receiving information about a payment device, a computer device, and location associated with the entity and searching the database to check whether there is a second alias whose payment device information, computer device information, and location information matches with the entity's information. If the payment device information, the computer device information, and the location information of the second alias match with the payment device information, the computer device information, and the location information of the entity then the second alias is associated with the entity.

Another embodiment of the present invention provides a method for transferring alias reputation information across a plurality of domains using a reputation server computer. The method includes receiving information related to a first alias associated with a first entity, the first entity being coupled to a first domain, calculating a reputation score of the first alias, storing the information related to the first entity and the reputation score of the first alias in a database, receiving a request, from a client system coupled to a second domain, for providing a reputation score for a second alias, determining whether the second alias is associated with the first entity, and providing the reputation score of the first alias to the client system coupled to the second domain, if it is determined that the second alias is associated with the first entity.

In some embodiments, a method for creating an alias data structure is provided. The method includes receiving information about a first alias associated with an entity, receiving information about a first object associated with the entity, analyzing the information about the first object; and associating the first object with the first alias based at least in part on the information about the first alias and information about the first object.

Some embodiments of the present invention provide a method for generating reputation information for an alias, wherein the alias is associated with an entity. The method includes the steps of receiving payment transaction information of an alias associated with the entity, the payment transaction information including payment transactions performed by the first entity, receiving non-payment transaction information of the alias, the non-payment transactions including transaction between the alias and one or more objects, analyzing the payment transaction information and the non-payment transaction information, associating the one or more objects with the alias based at least in part on the payment transaction information and the non-payment transaction information, and generating reputation information for the alias based at least in part on the payment transaction information and the non-payment transaction information associated with the entity and the one or more objects.

Transaction information is any information related to a transaction performed by an entity. In some embodiments, transaction information can include several items of information. For example, consider that a user 'A' purchases a gaming console from merchant 'B' for $300 using a credit card. in this instance transaction information includes name of the user 'A', name of the merchant 'B', the purchase price, the data and time of the transaction, location of merchant 'B', the model and serial number of the gaming console, the number of the credit card used for the purchase, the authorization information provided by the payment processing entity, and any other details that can be used to identify the transaction.

FIG. 1 shows a system 100 including a reputation identity and validation server computer 120. The reputation identity and validation server computer 120 includes an alias hierarchy and data structure database 104. The details of the reputation identity and validation server computer 120 and the alias hierarchy and data structure database 104 will be explained in detail below. System 100 also includes a first client computer 101 and a second client computer 102. Client computers 101 and 102 may be coupled to a merchant computer 110 that is coupled to a first online market place, e.g., a merchant doing business on Amazon.com. The same merchant computer may also be coupled to a second online marketplace, e.g., eBay. The client computer 101 and 102, the reputation identity and validation server computer 120, and the merchant computer 110 may communicate with each other over a network, e.g., the Internet.

Operation of the Reputation Identity and Validation Server Computer

The operation of the reputation identity and validation server computer 120 according to an embodiment will now be described.

Merchant 110 usually uses an alias to conduct business on the first online marketplace. An alias is an assumed name that the merchant 110 may use to interact with potential consumers on the first online marketplace. For example, a merchant selling surfing and water related products may use an alias "summerfun" to identify him on the first online market place. Similarly, a consumer may also use an alias to interact with other consumers and/or merchants on the first online marketplace. The use of the alias has many advantages over conventional ways of using one's name or other details. First, a merchant or consumer needs to divulge his personal and financial details to the other party while conducting a transaction. The merchant and/or the consumer merely have to provide his alias to the other party in the transaction. The backend processing may then use the alias information and process the transaction. For example, a consumer with an alias "beachboy" may purchase a surfing board from a merchant with an alias "beachboy." As part of the transaction, the consumer merely has to provide "summerfun" with his alias "beachboy." When the merchant processes the transaction, a back-end payment processing system, e.g., VisaNet can match up the alias with the correct consumer and process the transactions through regular processing channels. Thus, the consumer "beachboy" has avoided giving his credit card number to the merchant "summerfun" and the transaction was conducted merely by providing an alias identity. Another advantage of using an alias is the relative anonymity that a consumer and merchant may enjoy. However, as discussed earlier, the anonymity of persons conducting transactions over the Internet gives rise to trust issues.

In a typical transaction, a consumer will want to be assured that the transaction will proceed smoothly. This is not an issue with a traditional brick-and-mortar store since the consumer can actually carry his purchase with him immediately upon payment. Even in case of backordered items, the consumer can rely on the reputation of the store and knows that he has means to redress his problems should they arise. Online purchases do not enjoy the same type of trust relationships, partly because of the relative anonymity of the respective parties, lack of a proper mechanism to solve any issued that may arise, and lack of reliable information on trustworthiness of the parties involved in a transaction.

To address some of these issues, various online marketplaces have come up with their own ratings system for each merchant doing business on that marketplace. However, as discussed above, the ratings information is often unreliable and does not provide a true picture about the trustworthiness of a merchant. Moreover, the ratings system is limited to the merchants only and no ratings system currently in operation provides ratings on consumers. A merchant rating is often the most commonly used system for reputation information. However, each consumer may also have a certain reputation of his own. For example, there may be a consumer who has a habit of returning every/most of the products he buys within the return period. Such a behavior may indicate the consumer is using the products for free and has no intention of ever buying the products. Such information about the consumer may be helpful to the merchant. If the merchant can access this information prior to conducting a transaction with the consumer, the merchant may decide against selling a product to that consumer since returned products end up costing the merchant money to restock and resell.

The reputation identify and validation server computer solves these issues by compiling a database of information associated with individuals and entities and provide this information on request.

Referring to FIG. 1, in one embodiment, a user of the client computer 101 conducts a transaction with merchant who using the merchant computer 110 at a first online marketplace. The user of the client computer 101 has a bad experience with the merchant and leaves a negative feedback on the ratings section of the first online marketplace. Consider that the merchant has garnered enough negative reviews at the first online marketplace and as a consequence the merchant finds it difficult to sell his goods at the first online marketplace. The merchant now closes his shop at the first online marketplace and opens a new storefront at a second online marketplace using the same merchant computer 110. Since the merchant is new to the second online marketplace, he has no reputation/rating at the second online marketplace. In effect he has completely delineated himself from the negative ratings at the first online marketplace and now again continue perpetuating fraud at the second online marketplace with impunity. The current rating systems are restricted to a particular domain and hence cannot be accessed by users on other domains. For example, a user using the client computer 102 currently has no way to find out if the merchant at the second online marketplace is the same merchant with negative ratings at the first online marketplace.

In an embodiment of the present invention, the client computer 102 can send a request to the reputation identity and validation computer server for providing reputation information about an alias associated with an entity, e.g., the merchant, prior to conducting a transaction with the entity. The reputation identity and validation server computer 102 can search a database that stores alias reputation information and locate the reputation information for the alias and provide the reputation information to the client computer 102. Since the reputation and validation engine captures information about an alias from various sources and is not specific to a particular domain, even if the merchant moves from the first online marketplace to a second online marketplace, he cannot hide his identity from the alias identity and reputation validation server. Thus, even though the merchant is new to the second marketplace, the alias identity and reputation validation server computer can analyze the information gathered from the merchant at the second marketplace and match it with information received from the first marketplace and conclude that this is the same merchant. Once this is determined, all the reputation information and ratings for the merchant from the first marketplace is ported to the second marketplace. Thus, even on the first day of starting is business on the second marketplace, a merchant may have a long history of reputation information associated with him. This helps to rout out the bad merchants and promote good merchants.

Figure 2:
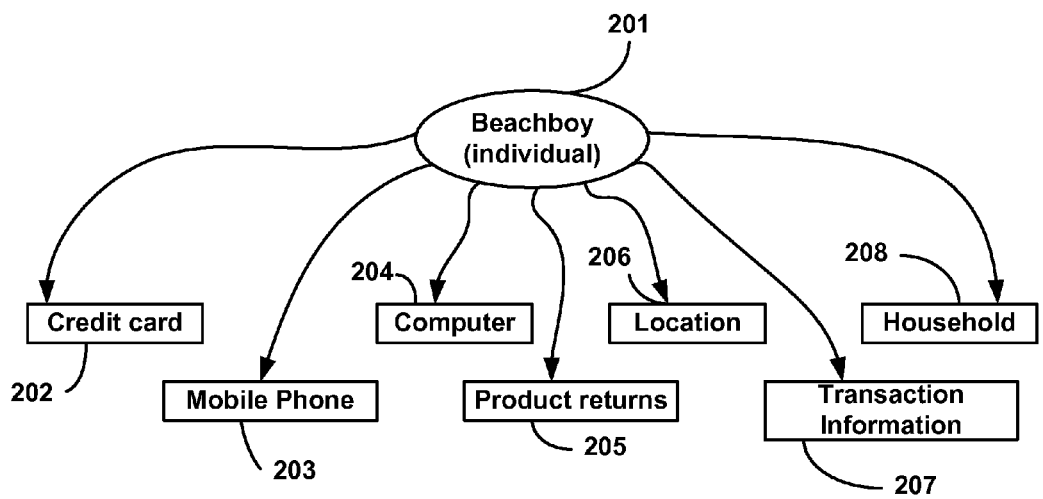
FIG. 2 illustrates a schematic for types of information associated with an alias of an individual according to an embodiment of the present invention.

FIG. 2 illustrates some of the sources that the alias identity and reputation validation server computer 120 may use to gather information about an entity or an individual and create a profile of that individual. An individual may use an alias 201 called "beachboy." The alias identity and reputation validation server computer 120 may store information about his credit card 202, mobile phone 203, the computer(s) that he uses to conduct online transactions 204, a history of product returns 205, his location 206, information about his transactions 207, and information about his household 208. It is to be noted that the list of items listed in FIG. 2 are for illustration purposes only. One skilled in the art will realize that there are many more sources of information that may be used to create a profile for an individual.

Figure 3:
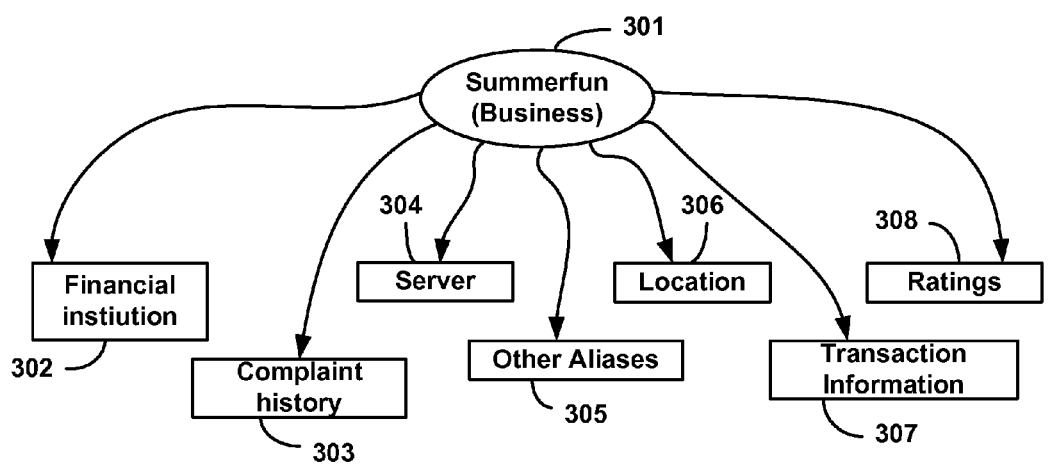
FIG. 3 illustrates a schematic for types of information associated with an alias of an entity according to an embodiment of the present invention.

FIG. 3 illustrates the various sources of information that may be used to create an alias profile of a business entity 301. The alias profile 301 may include information about the financial institutions used by the entity to conduct its business 302, the complaint history of the entity 303, information about the server computer used by the entity 304, any other aliases used by the entity 305, location of the entity 306, transaction information about the entity 307, and any ratings information 308. It is to be noted that the list of items listed in FIG. 3 are for illustration purposes only. One skilled in the art will realize that there are many more sources of information that may be used to create a profile for an entity.

Since the alias identity and reputation validation server computer 120 collects information from several sources, a potential merchant/entity and/or and individual will find it difficult to hide their identity from the alias identity and reputation validation server computer 120. The data about an alias is stored within the alias identity and reputation validation server computer 120 in form of an alias hierarchy and data structure 104.

In an embodiment, once the alias identity and reputation validation server computer receives a request to provide reputation information about an alias associated with an entity, the alias identity and reputation validation server computer checks to see if the entity has additional aliases. If it is determined that the entity has additional aliases, the alias identity and reputation validation server computer searches for reputation information of the additional aliases. The alias identity and reputation validation server computer can then provide the information about the other aliases in addition to the reputation information of the alias that is requested. For example, if a single entity is using two different aliases "summerfun" and "indiansummer" to do business on two different marketplaces, the alias identity and reputation validation server computer can consolidate the reputation information for both these aliases and make that consolidated reputation information available to anyone searching for reputation information about either "summerfun" or "indiansummer." Thus it will be hard for that entity to hide its identity from the alias identity and reputation validation server computer.

In some embodiments, the alias identity and reputation validation server computer may determine whether the entity has additional aliases by receiving information about a payment device, e.g., a credit card or an account held at a financial institution, information about a computer device used by the entity, and location of the entity. In some embodiments, the information about the computer device may include an Internet Protocol (IP) address of the computer device, hardware configuration information of the computer device, and information about applications installed on the computer device. The alias identity and reputation validation server computer then searches the database to check whether there is a second alias whose payment device information, computer device information, and location information matches with the entity's information. If the payment device information, the computer device information, and the location information of the second alias match with the payment device information, the computer device information, and the location information of the entity, the alias identity and reputation validation server computer associates the second alias with the entity. For example, as described above, if a single entity is using two different aliases to conduct its business but is using the same payment device, the same server computer and is operating out of the same location, the alias identity and reputation validation server computer analyzes this information and concludes that both these aliases belong to the same entity and links the two aliases together.

In some embodiments, the reputation information for an alias may be presented in the form of a reputation score. In some embodiments, a 'reputation score' can refer to any relative value that can be associated with the reputation of an alias. The reputation score can measure the relative reputation of an alias (e.g., a Website name, a payee name that is not the same as an actual payee name, etc.) relative to other aliases. It may alternatively be an absolute score. Such scores may be represented by numbers, letters, or any other suitable type of value. In general, the reputation score conveys a level of trustworthiness of a particular alias, both as a standalone value and in relation to other aliases. For example, in one embodiment, the reputation score can be based on a scale of 1 to 100, where 1 represents the lowest score indicating very poor customer service while a score of 100 indicates superior customer service. It is to be understood, that various other ways of indicating a reputation score are also possible. The reputation score may be displayed in the vicinity of the alias whenever the alias is presented to the requestor. In other embodiments, the reputation information and/or reputation score may be stored on a central server or the alias identity and reputation validation computer server and the user may be provided a link to access the reputation information/reputation score. Upon clicking the link, a potential user who is looking for reputation information about an alias, will be directed to a dedicated location where the reputation information is available. In some embodiments, access to the reputation information may be provided free of cost to the user. In other embodiments, access to the reputation information may be subscription based for a nominal fee.

In some embodiments, the alias identity and reputation validation server computer receives information related to a first alias that is associated with a first entity. The first entity is coupled to a first domain, e.g., the first online marketplace of FIG. 1. The alias identity and reputation validation server computer calculates a reputation score of the first alias based on information related to the first alias. The alias identity and reputation validation server computer stores the information related to the first entity and the reputation score of the first alias in a database. The alias identity and reputation validation server computer receives a request from a client computer that is coupled to a second domain e.g., the second online marketplace of FIG. 1 for providing a reputation score for a second alias. The alias identity and reputation validation server computer determines whether the second alias is associated with the first entity. If the alias identity and reputation validation server computer determines that the second alias is associated with the first entity, the alias identity and reputation validation server computer provides the reputation score of the first alias to the client computer coupled to the second domain. For example, consider that the first entity is a merchant having an alias 'merchant 1' is operating as firstmarket.com and the same merchant uses the alias 'merchant 2' and operates as secondmarket.com. Consider that 'merchant 1' has been in business for a long time and has garnered a reputation score of 80, which can indicate that 'merchant 1' has good customer service. On the other hand 'merchant 2' is relatively new and does not have a reputation score. In this instance, a user wishing to do business with 'merchant 2' might be apprehensive about dealing with 'merchant 2'. In this instance, the alias identity and reputation validation server can analyze the information about 'merchant 2', e.g., server details, location, IP address, etc. and determine that 'merchant 2' is the same as 'merchant 1' and can transfer the reputation information, e.g., a reputation score of 'merchant 1', and associate that reputation score to 'merchant 2'. Thus a user wishing to do business with 'merchant 2' can now be provided with the reputation score even though 'merchant 2' is new to the market.

In some embodiments, the alias identity and reputation validation computer server, as part of calculating the reputation score for an alias, analyzes transaction information related to the first alias to determine a transaction risk score for the first alias. The alias identity and reputation validation computer server also analyzes the non-transaction based information related to the first alias and calculates a reputation score based at least in part on the transaction risk score and the non-transaction information. A transaction risk score can be an indication about the likelihood of a particular transaction being processed successfully. In other words, a transaction risk scores can predict a likelihood of success of a particular transaction. For example, consider that the transaction history of a user with alias 'user A' reveals that 'user A' has been involved in numerous transactions that resulted in the 'user A' returning the product that was previously bought. A potential merchant who wants to sell a product to 'user A' can be provided with this information in the form of a transaction score indicating that there is low likelihood of the transaction completing successfully. The merchant can then decide whether he wants to do business with 'user A'. In addition, this information can be used to generate reputation information for 'user A'.

In some embodiments, the transaction information for the first alias may include information about a payment method used by the first entity, a history of chargebacks offered by the first entity, a financial entity where the first entity has an account, and complaints received by the first entity for its products or services. The non-transaction information for the first alias may include information about a computer system used by the first entity, location of the computer system used by the first entity, and contact information of the first entity. It should be noted that the examples for transaction and non-transaction information discussed above are for illustration purposes only. One skilled in the art will realize that there are many more types of transaction and non-transaction information that may be received and analyzed by the alias identity and reputation validation computer server.

In some embodiments, in order to determine whether the second alias is associated with the first entity, the alias identity and reputation validation computer server receives information about the second alias. The information includes transaction information and non-transaction information. The alias identity and reputation validation computer server compares the information about the second alias with information related to the first alias. If the information about the second alias matches with the information related to the first alias, the alias identity and reputation validation computer server associates the second alias with the first entity. In some embodiments, the information about the second alias need not completely match the information related to the first alias. Criteria for matching can be set in order to conclude that the second alias is linked to the first entity. For example, certain types of transaction information and non-transaction information may be given importance in the matching process. If a certain percentage of important items of transaction information and non-transaction information are common between the second alias and the first alias, the alias identity and reputation validation computer server can conclude that the second alias also belongs to the first entity. For example, the information about a bank account for the first entity may have higher importance than a history of chargebacks offered by the entity. Similarly, information about the hardware configuration of the server used by the first entity may have more significance than the information about applications running on the server. It will be realized that the criteria may be customized according to the use cases and may be modified at any given point.

The alias identity and reputation validation computer server stores data related to one or more aliases. Each item that is linked to an alias is called an "object." An object can be a device, a person, or an entity/organization. For example, reference numerals 202-207 of FIG. 2 and reference numerals 302-308 of FIG. 3 are objects linked to their respective alias. The alias identity and reputation validation computer server receives transaction data related to one or more aliases and creates an alias hierarchy and data structure in order to establish the various bindings between the aliases and their objects.

Alias Hierarchy and Data Structure

Figure 4:
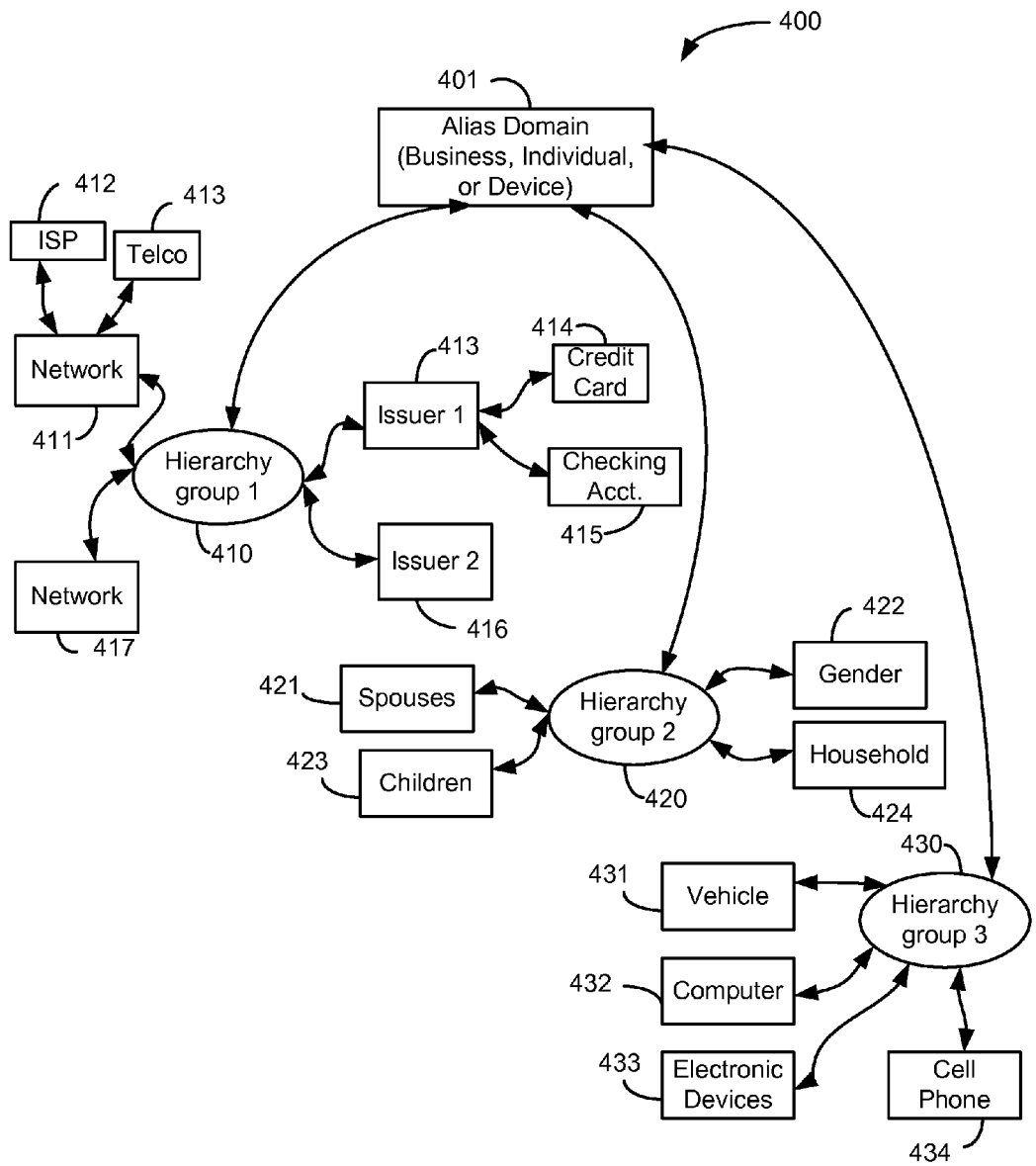
FIG. 4 illustrates an alias hierarchy and data structure according to an embodiment of the present invention.

FIG. 4 illustrates an alias hierarchy and data structure tree 400 according to an embodiment of the present invention. The alias hierarchy and data structure tree 400 includes a top-level alias 401 to which all other aliases and objects are linked. The alias 401 may be associated with an entity/organization, a person/individual, or a device. In some embodiments, alias 401 may be linked to other aliases within or outside a particular tree. Alias 401 may be linked to various hierarchy groups

410, 420, and 430. The hierarchy groups are used to arrange the data in a manageable form and for ease of search using standard database queries. Each of these hierarchy groups may represent a particular area, e.g., devices, household, individual, entity/business, etc. In FIG. 4, the hierarchy group 410 is referred to as the business domain. This hierarchy group relates to a business entity that may be owned or operated by owner of the alias 401. The hierarchy group 410 may have several objects linked to it. Each of the objects linked to the hierarchy group 410 in turn may have an alias associated with them. As illustrated, the hierarchy group 410 may have an object 411 associated with it. The object 411 may be a network used by the business entity. The object 411 may further have objects 412 and 413 associated with it. In an embodiment, object 412 may be the internet service provider (ISP) used by the business entity and the object 413 may be the telephone company that provides telephone service to the business entity. In addition, the hierarchy group 410 may have other network type objects linked to it. The object 413 may also have other objects 414 and 415 linked to it. The object 413 may represent a financial institution, e.g., a bank, which issues a credit card 414 and where the business entity has its checking account 415. Each of the objects 414 and 415 may also have an alias associated with them. Similarly, hierarchy group 410 may have another financial institution 416 associated with it that may represent a different bank where the business entity has an account.

Hierarchy group 420 is related to an individual domain. The hierarchy group 420 includes information about an individual and his household. For example, hierarchy group 420 may have an object 421 that represents the spouse of the individual, an object 422 that specifies the gender of the individual, an object 423 that represent the children of the individual, and an object 424 that represents the household of the individual. The object 424 may be further liked to one or more objects that represent, the address of the household, the parcel number of the household, etc. Similarly, object 421 may be further linked to other objects that represent the spouse's age, gender, any other children of the spouse, etc.

Hierarchy group 430 is related to devices that may be used by a business entity or an individual. The hierarchy group 430 may also have various subjects associated with it. In an embodiment, the hierarchy group may have objects 431, 432, 433, and 444 associated with it. The object 431 may represent the vehicle owned by the individual or the business entity. The object 432 may represent the computer owned by the individual or the business entity. The object 433 may represent various other electronic devices owned by the individual or the business entity. The object 434 may represent a cell phone owned by the individual or the business entity. In some embodiments, the object 434 may have additional objects associated with it that may represent various attributes of the object 434. For example, the object 434 may have attributes that represent a phone number, serial number of the cell phone device, a serial number of a SIM card installed in the cell phone, associated with the object 434. In some embodiments, each of the attributes may be an object and have a unique alias associated with the object. As described earlier, each of the objects associated with any of the hierarchy groups may have a unique alias associated with them.

In some embodiments, an object in one hierarchy group may also be associated with another object in a different hierarchy group. For example, object 434 (cell phone) may be associated with object 414 in the instance where the cell phone is also a payment device, e.g., implementing contactless card technology. In some embodiments, one hierarchy group may be linked to another hierarchy group for the same alias or a different alias. For example, if a husband and wife share the same household, the hierarchy group associated with the household may be linked to alias of the husband as well as the alias of the wife, or to any other hierarchy groups that are linked to the alias of the husband or the wife.

Thus it can be seen that each hierarchy group can include multiple levels of objects linked to each other within the same hierarchy group. In addition, objects in one hierarchy group can be linked to objects in different hierarchy groups.

In some embodiments, the alias identity and reputation validation computer server generates the alias hierarchy and data structure. The method for generating the alias hierarchy and data structure includes receiving transaction information related to a first alias that is associated with an entity. The method further includes receiving transaction information between a first object and the entity, and associating the first object with the first alias based at least in part on the transaction information related to the first alias and transaction information between the first object and the entity. For example, when person A buys a gaming console using his credit card, the gaming console can be associated with that person based on the transaction of buying the gaming console. The person may have an alias associated with him. The credit card and the gaming console are objects. So when information about a transaction of the person A buying the gaming console is received by the alias identity and reputation validation computer server, it can associate the gaming console with the alias of person A. An entity can be a person or an organization, e.g., a business. An object can be a device, a person, or an organization In some embodiments, the transaction information received by the alias identity and reputation validation computer server can include payment transaction information as well as non-payment transaction information. For example, as described above, whenever someone buys an item, the payment transaction information can be received by the alias identity and reputation validation computer server, e.g., via a payment processing network. A non-payment transaction is the one where the details of the transaction cannot be captured by the payment processing entity or any other financial institutions. For example, a person may decide to meet another person in a city where the two persons only had an on-line interaction prior to the in-person meeting. In such an instance, it would be beneficial for both the persons to know whether the other person is reputable enough to be trusted. Some of the other non-payment transactions may include cash-only transactions that cannot be automatically captured by the payment processing entity.

In some embodiments, the alias identity and reputation validation computer server continually monitors transaction information related to an alias, e.g. a person. The alias identity and reputation validation computer server updates the association of the alias with an object in response to the received transaction information. For example, if that person purchases a camera using his alias, the camera is automatically associated with the alias of that person. In some embodiments, updating the association includes adding objects to a particular alias hierarchy. In some embodiments, updating the associations can also include severing the association if it is determined that the object is no longer associated with the alias based at least in part on the transaction information related to the first object. For example, if that same person now returns the camera, the association between the camera and the alias of the person is severed based on the information received from the transaction of returning the camera.

In some embodiments, the method of generating the alias hierarchy structure further includes analyzing the associations of various objects. If it determined that there are two objects that are associated with the same alias, the alias identity and reputation validation computer server associates the two objects with each other. For example, if a male person A is associated with a female person B and a child C under the same hierarchy group, then the alias identity and reputation validation computer server analyzes this association and determines whether the female person B should be associated with the child C. In some embodiments, if the female person B is associated with the child C if there are other factors that suggest that association is proper. As described above, in addition to associating an object with an alias, an alias can also be associated with another alias in a similar manner by analyzing the association of one or more objects with the two aliases.

In addition to the transaction information about objects being automatically received by the alias identity and reputation validation computer server, each object can be individually managed manually by the owner of the alias to which the object is associated with. Not all information about an object can be automatically obtained. In such instances, it may be necessary to manually manage the information and association of such objects. For example, if a buyer purchases a computer from a seller, both of whom are individuals, using cash payment, there is no reliable way of recording this transaction. The alias identity and reputation validation computer server will have no way of knowing that the computer now belongs to the buyer and that the computer should be associated with the buyer. In such instances, the buyer will have to send the information about the computer to the alias identity and reputation validation computer server so that the alias identity and reputation validation computer server may associate the computer with the buyer.

Some embodiments of the present invention provide means for managing objects. The means can be provided a web interface that can communicate with the alias identity and reputation validation computer server. A user can enter information relating to an object via the web interface and communicate that information to the alias identity and reputation validation computer server. The alias identity and reputation validation computer server can then update the association accordingly. One skilled in the art will realize that management function for the objects may be provided using various other means. For example the management functions for the various objects may be implemented as a GUI interface accessible by the user. The GUI interface may be accessible to the person or entity over a network, e.g., the Internet. In some embodiments, the various management functions for the object may be accomplished by using a portable communication device, e.g., a cellular phone. In some embodiments, a method for managing one or more objects associated with an alias is provided. The method includes receiving input related to a first object that is associated with a first alias. The input specifies an operation to be performed on the object. The method further includes performing the specified operation on the object and updating association information between the first object and the first alias based at least in part on results obtained after performing the specified operation. In some embodiments, the specified operation is chosen from a list comprising deleting the first object, duplicating the first object, updating one or more attributes of the first object, and revoking one or more privileges associated with the first object. The various operations that can be performed on an object are described below.

Figure 5:
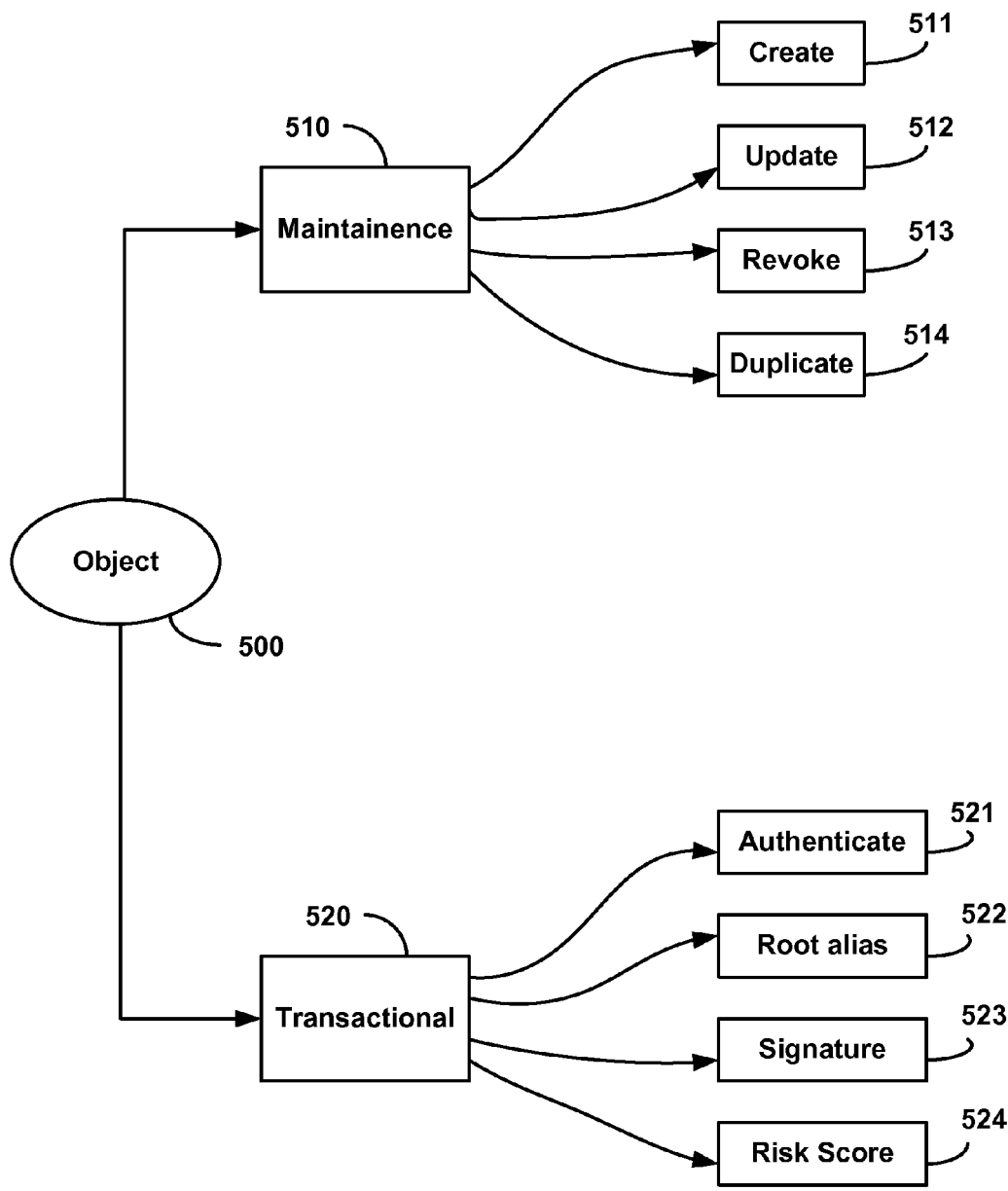
FIG. 5 illustrates the various management functions that may be performed on an object according to an embodiment of the present invention.

FIG. 5 illustrates the various management functions that can be performed on an object 500, according to an embodiment of the present invention. In an embodiment, the management functions can be facilitated through a web interface accessible by the user. In other embodiments, the management function can be implemented in a client-server environment where the user computer is the client and the alias identity and reputation validation computer server can act as the host server. In some embodiments, the object management functions can be categorized as maintenance functions 510 and transactional functions 520. In some embodiments, the maintenance functions 510 can include a create function 511, an update function 512, a revoke function 513, and a duplicate function 514. The transactional function may include an authenticate function 521, a root alias function 522, a signature function 523, and a risk score function 524.

Create function 511 can be used to add a new object to an alias hierarchy and associate that object with an alias and/or other objects. For example, as described above, if a user purchases a mobile communication device from another user by paying cash, the payment processing system cannot capture this transaction. In such an instance, the user can manually add the mobile communication device to his alias using the create function 511. The update function 512 can be used to update association information between an object and an alias or another object. For example, consider that a person owns a gaming console that has been linked to his alias. If the person then gifts the gaming console to his kid, the person may want to disassociate the gaming console from his alias and add the gaming console to the kid's alias. The person can then use the update function to change the linkage of the gaming console from his alias to his kid's alias. In some embodiments, the update function 512 can include the create function 511 and the revoke function 513. The revoke function 513 can be used to delete an association of an object with an alias or to delete an object from a hierarchy group. In some embodiments, the revoke function can also be used to disable one or more attributes of an object. For example, wireless connectivity of a portable media player can be disabled using the configuration menu of the portable media player. The duplicate function 514 may be used to assign a same alias to two different objects. For example, a person may have a home computer and a work computer. He may want to interchangeably use both computers without any external system knowing which computer he is using at any given time. In such an instance, the person can manually assign the same alias to both the computers and link the two computers to his alias using the duplicate function 514.

Transactional functions 520 are managed by the alias identity and reputation validation server as part of transaction authorization and authentication process described below in FIG. 6. Usually, a payment processing system, e.g., VISANet, incorporating the alias identity and reputation validation computer server may perform the transactional operations related to an object. The various transaction functions described below may be performed real-time when a transaction is received by the payment processing system for validation and authorization. These transactional functions are transparent to the parties involved in the transaction.

Authorize function 521 relates to determining whether object 500 is authorized to conduct the transaction. For example, object 500 may be a child in a household that has a credit card liked to it. The credit card for the child is also linked to his father's alias and has a certain spending limit associated with it. If the child attempts to conduct a transaction that is more than the spending limit on his credit card, authorize function 521 checks the alias hierarchy to determine whether the child, e.g., object 500, is authorized to spend the requested amount and accordingly deny the transaction if the transaction amount is more than the spending limit. In some embodiments, authorize function 521 may cause generation of a message that is delivered to the father (root alias) of the child indicating the details of the transaction. The father may then decide to approve the transaction.

Root alias function 522 may be used to determine the root alias of object 500. For example, in the example above, the system may check the root alias of the child requesting the transaction prior to processing the transaction. In other words, the system may determine the root alias, e.g., alias domain 401 of FIG. 4, of the alias hierarchy that the child belongs to and verify that the information provided by the child during the transaction matches with information of the root alias. In the instance that the child's credit card is stolen and is being used in a different city then the child's usual place of residence, the system may check the root alias to determine the probability that the person using the credit card currently is the child based on other information about the child stored in the alias hierarchy. The system may deny or put a hold on the transaction if it is determined that the root alias information does not match with the person currently using the credit card. The system may request additional information from the child and/or the father (root alias) to determine authenticity of the transaction.

Signature/authenticate function 523 may be used to authenticate object 500 as being the proper entity as represented. This function is similar to verification of signature or other authenticating methods used in the conventional payment processing system. The difference being this is done real-time as part of the payment processing process using the information in the alias tree in addition to information gathered from other sources.

Risk score function 524 may be used to generate a risk score for the particular transaction. In some embodiments, the risk score may be based on results obtained from functions 521, 522, and 523. Based on the various determinations about object 500 and its root alias, the system can generate a real-time risk score for the transaction. Risk score is described in detail above.

The various functions described above in relation to management and verification of an object are for illustrative purposes only. One skilled in the art will realize that various other functions may be provided for managing and verifying the objects. The additional functions may be in addition to or in lieu of the functions described above.

The Alias Identity and Reputation Validation Computer Server

As described above, the alias identity and reputation validation computer server received information about payment transaction information and non-payment transaction information for an alias and/or and object and based on that information, the alias identity and reputation validation computer server manages an association between an object and an alias. In some embodiments, the alias identity and reputation validation computer server receives the payment transaction information through a payment processing network, which acts as a payment clearance entity for payment transactions. FIG. 6 shows an embodiment of a typical payment processing transaction.

Figure 6:
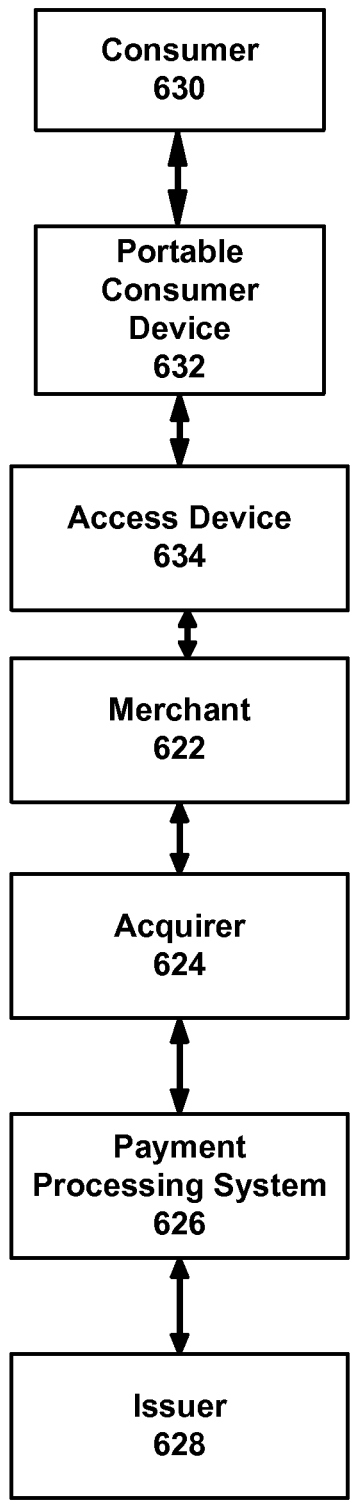
FIG. 6 is a block diagram illustrating a payment transaction process according to an embodiment of the present invention.

FIG. 6 shows a system 620 that can be used in an embodiment of the invention. The system 620 includes a merchant 622 and an acquirer 624 associated with the merchant 622. In a typical payment transaction, a consumer 630 may purchase goods or services at the merchant 622 using a portable consumer device 632. The acquirer 624 can communicate with an issuer 628 via a payment processing system 626.

The consumer 630 may be an individual, or an organization such as a business that is capable of purchasing goods or services.

The portable consumer device 632 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing system 626 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 626 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing system 626 may use any suitable wired or wireless network, including the Internet.

The merchant 622 may also have, or may receive communications from, an access device 634 that can interact with the portable consumer device 632. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, and the like.

If the access device 634 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 632.

In a typical purchase transaction, the consumer 630 purchases a good or service at the merchant 622 using a portable consumer device 632 such as a credit card. The consumer's portable consumer device 632 can interact with an access device 634 such as a POS (point of sale) terminal at the merchant 622. For example, the consumer 630 may take a credit card and may swipe it through an appropriate slot in the POS terminal. Alternatively, the POS terminal may be a contactless reader, and the portable consumer device 632 may be a contactless device such as a contactless card.

An authorization request message is then forwarded to the acquirer 624. After receiving the authorization request message, the authorization request message is then sent to the payment processing system 626. The payment processing system 626 then forwards the authorization request message to the issuer 628 of the portable consumer device 632.

After the issuer 628 receives the authorization request message, the issuer 628 sends an authorization response message back to the payment processing system 626 to indicate whether or not the current transaction is authorized (or not authorized). The transaction processing system 626 then forwards the authorization response message back to the acquirer 624. The acquirer 624 then sends the response message back to the merchant 622.

After the merchant 622 receives the authorization response message, the access device 634 at the merchant 622 may then provide the authorization response message for the consumer 630. The response message may be displayed by the POS terminal, or may be printed out on a receipt.

At the end of the day, a normal clearing and settlement process can be conducted by the transaction processing system 626. A clearing process is a process of exchanging financial details between and acquirer and an issuer to facilitate posting to a consumer's account and reconciliation of the consumer's settlement position. Clearing and settlement can occur simultaneously.

Figure 7:
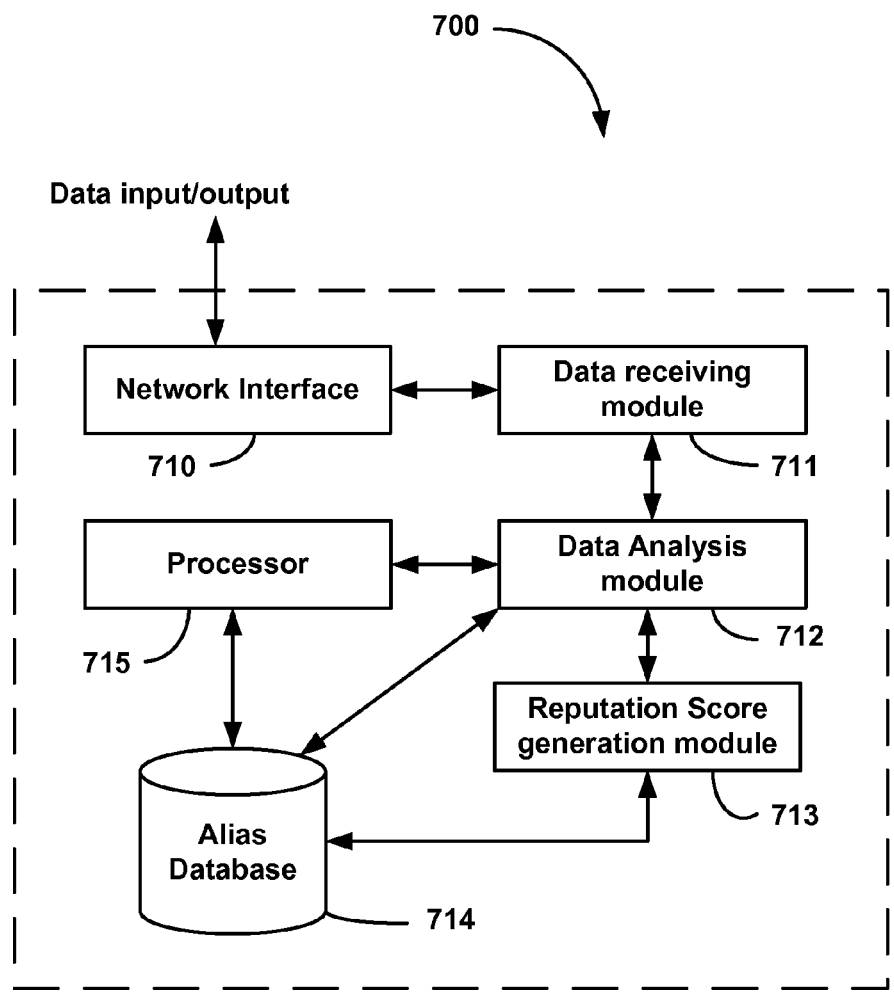
FIG. 7 is a block diagram of an alias identity and reputation validation computer server according to an embodiment of the present invention.

FIG. 7 illustrates a block diagram of an alias identity and reputation validation computer server (henceforth "alias sever") 700 according to an embodiment of the present invention. The alias server 700 includes a network interface module 710. The network interface module 710 communicates with one or more external systems in order to send and receive data. In some embodiments, the network interface module 710 communicates with a payment processing network to gather payment transaction data related to one or more aliases and/or objects. In some embodiments, the network interface module 710 communicates with one more devices (objects) on the Internet to gather non-payment transaction data related to the devices in order to determine the alias that the devices are associated with. In an embodiment, the non-payment transaction information includes information about data transmission between an alias and an object. In some embodiments, the network interface module 710 sends the reputation information to any client computer that requests such information.

The alias server 700 further includes a data receiving module 711 that receives payment transaction information and non-payment transaction information of an alias associated with an entity and/or an object, from the network interface module 710. The data receiving module 711 communicates the received data to a data analysis module 712. In some embodiments, the data receiving module 711 includes the network interface module 710 and receives the payment transaction information directly from a payment processing network. In some embodiments, the data receiving module 711 is configured to periodically receive the payment transaction information between the object and the alias. The data analysis module 712 analyzes the payment transaction information and non-payment transaction information related to the object and/or the entity and associates the object with the alias based at least in part on the payment transaction information and non-payment transaction information, wherein the payment transaction information and non-payment transaction information includes transactions between the alias and the object. The data analysis module 712 communicates the association information between the alias and the object to a reputation information/score generating module 713 and also communicates the association information to a storage system 714. In some embodiments, the data analysis module 712 determines whether there is a first object that shares payment transaction information and/or non-payment transaction information with a second object, wherein both the first object and the second object are associated with the alias and associates the first object with the second object, if it is determined that the first object shares payment transaction information and/or non-payment transaction information with the second object.

The reputation information/score generating module 713 further analyzes the received association information and applies a set of predetermined criteria to evaluate transaction risk for the object and the alias. In some embodiments, the criteria include looking at the prior history for the alias to predict future behavior of the alias, the type of transaction, the amount of transaction, etc. In some embodiments, the reputation information/score generating module 713 can generate a numeric score to indicate a reputation of the alias. In some embodiments, the reputation information/score generating module 713 generates reputation information for the alias based on the payment transaction information and non-payment transaction information. In some embodiments, the reputation information/score generating module 713 receives information regarding a request for a transaction between a first object and the alias. In this instance, the reputation information/score generating module 713 determines a reputation for the first object and the reputation for the alias and in addition determines a risk score for the transaction between the first object and the alias. The reputation information/score generating module 713 then provides the risk score to the first object and to the alias. In some embodiments, the reputation information/score generating module 713 continually updates the reputation information for an alias based on payment transactions and non-payment transactions conducted by the alias.

In some embodiments, the reputation score is calculated based on frequency of transactions performed by an alias over a period of time. For example, consider that a person buys gas from a particular gas station near his house once a week on Saturday. The alias server 700 gathers this information over a period of time to build a profile of that person. In doing so, the alias server may assign a score of 400 for that particular activity. This score is adjusted on a weekly basis based on the person's gas purchase. So, when the person purchases gas in week 1 at that gas station his reputation for that transaction may be lowered to zero until he buys gas again the following week. If that person buys the gas as expected in week 2 at that gas station, his reputation score becomes 400 again since he has acted in conformity to his pattern of behavior. On the other hand if the person buys gas in week 2 from a different gas station, his reputation score may only be 200 since the expected behavior did not occur. In the instance where the person follows a regular routine of filling gas at the particular gas station, his reputation score keeps on improving with each successive gas purchase. The same method can be applied to any other payment transaction conducted by the person to determine a reputation score. Details of frequency based transaction processing are described in commonly-owned and co-pending U.S. patent application Ser. No. 12/773,770 filed on May 4, 2010, the contents of which are hereby incorporated by reference in their entirely for all purposes. Thereafter, the non-payment transactions can be factored in to generate comprehensive reputation information about that person.

In some embodiments, the reputation information/score is generated based on the context of transactions performed by the alias using a customized technique in addition to the frequency. Context-based transactions can be further categorized into expected state context and current state context. For example, in the gas station example described above, the system can predict based on the person's past behavior that the person is likely to buy gas at that gas station on a certain day of the week. In some embodiments, the system can alert the gas station that they should expect the person to buy gas. The gas station may then offer a coupon or some other incentive to the person increasing the chances that the person will buy gas from that gas station. The current state context refers to the situation where the person actually buys gas at the gas station as expected. In some embodiments, when the expected state context matches the current state context, it may result in a positive reputation for the person and vice versa.

In some embodiments, the reputation score may vary by time and space. For example, if analysis of consumer's transactions over time indicates that he buys gas at a gas station near his residence in city A every week, the consumer may be assigned a reputation score of e.g., 700 (very good). However, if a transaction indicates that the consumer bought gas in a different city B, which he has never visited before, he and/or the transaction may be assigned a reputation score of 50 (very low) for city B indicating that this does not conform to the consumer's pattern of transactions. A low reputation score may alert the concerned organizations, e.g., the issuer, to monitor the transaction for possible fraud. In such instances, the issuer may use an out of band communication method, e.g., a phone call, to confirm the transaction with the consumer before authorizing the transaction in city B. This helps to safeguard the consumer from possible fraud on his account and also helps the issuer by limiting their exposure to potential fraudulent transactions using their payment devices.

Once the reputation information/score generating module 713 generates the reputation information/score, that information/score is communicated to the storage system 714. As discussed above, the storage system 714 also stores the association information between the object and the alias. In some embodiments, the reputation information/score and the association information between the object and the alias can be stored in an alias database implemented in the storage system 714. The alias database may be a conventional database including capability of being searched at multiple levels with the use of proper queries. In some embodiments, the storage system 714 also stores the alias hierarchy and data structure, e.g., as discussed with reference to FIG. 4 above. The alias server 700 further includes a processor 715 that controls the operation of the alias server 700 and provides the computing power to perform the various operations. The alias server 700 also includes a processor 715 that is coupled to the various modules and provides the means for operating the alias server 700.

In some embodiments, the alias server 700 sends the reputation information for an alias and/or an object to a payment processing network. The payment processing network receives the reputation information of the object and the reputation information of the alias and determines whether to allow or deny a transaction between the object and the alias, based at least in part on the reputation information of the object and the reputation information of the alias.

Some embodiments of the alias server 700 can perform a method for generating reputation information for an alias, wherein the alias is associated with an entity. The method includes receiving payment transaction information related to a first alias associated with a first entity. In some embodiments, the payment transaction information includes payment transactions performed by the first entity. The method further includes receiving non-payment transaction information related to the first alias where the non-payment transactions include transaction between the first alias and one or more objects. The alias server 700 analyzes the payment transaction information and the non-payment transaction information and associates the one or more objects with the first alias based at least in part on the payment transaction information and the non-payment transaction information. The alias server 700 generates reputation information for the first alias based at least in part on the payment transaction information and the non-payment transaction information related to the first alias and to the one or more objects. In some embodiments, the alias server 700 receives information about a transaction between a first object and a second object, from among one or more objects and associates the second object with the first object. In some embodiments, the alias server 700 periodically monitors transaction information between the first alias and the one or more objects and updates the associations between the first alias and the one or more objects. As discussed above, the updating of the associations can include severing an association between a first object and the first alias or creating an association between a second object and the alias where none existed before.

In some embodiments, the alias server 700 receives the payment transaction information is received from a payment processing network, e.g., VisaNet. In some embodiments, generating reputation information includes generating a reputation score for the first alias. In some embodiments, the method for generating reputation information includes providing risk analysis information for a transaction between the first alias and an object after initiation of the transaction but prior to completion of the transaction. In some embodiments, the method further includes receiving information about payment transaction and non-payment transaction of a second alias, analyzing the information about the payment transaction and the non-payment transaction of the second alias to determine whether the second alias is associated with the first entity, and if it is determined that the second alias is associated with the entity, associating the second alias with the first alias and associating the reputation information of the first alias with the second alias.

Figure 8:
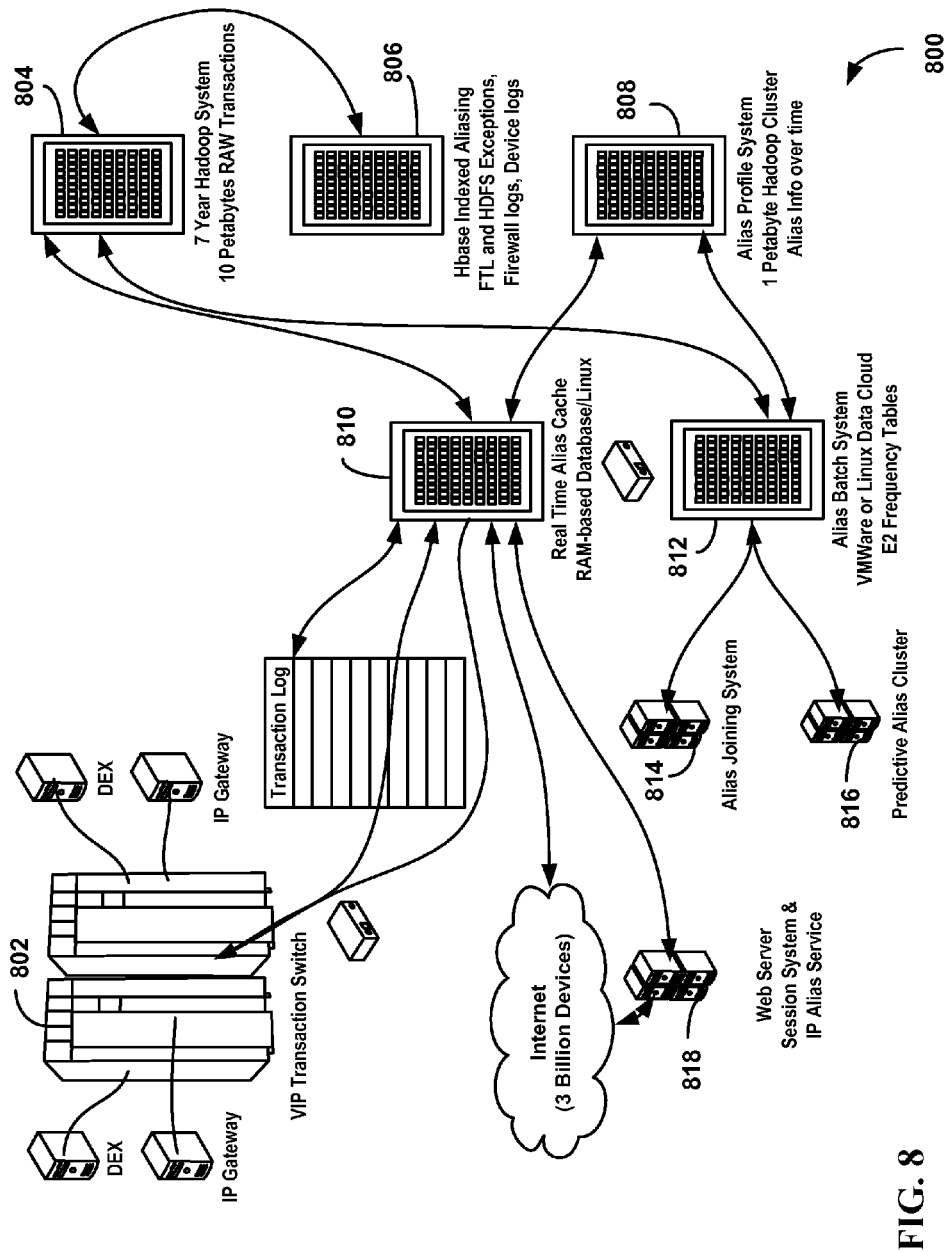
FIG. 8 is a block diagram of a system for managing alias reputation information, according to an embodiment of the present invention.

FIG. 8 is a block diagram of a system 800 for generating and managing reputation information according to an embodiment of the present invention. The system 800 includes a payment processing and analysis module 802, a data collection module 804, an alias indexing module 806, an alias profiling module 808, an alias caching module 810, an alias batch processing module 812, an alias joining module 814, a predictive alias module 816, and a web server 818.

The payment processing and analysis module 802 captures all the payment transaction data for an alias. In some embodiments, the payment processing and analysis module 802 is operated by a payment processing entity and captures real-time data related to payment transactions conducted by a person or an entity. In some embodiments, the payment processing and analysis module 802 uses a frequency based transaction processing technique described above to analyze the process the payment transaction. The payment processing and analysis module 802 can be implemented using specialized server computer(s) that includes customized software and are programmed to manage payment authorization and processing.

The payment processing and analysis module 802 communicates the collected raw transaction data to the data collection module 804. The data collection module 804 can be implemented as one or more server computers. In some embodiments, the data collection module 804 is a hadoop cluster with over 10 petabytes of storage capacity. A Hadoop Distributed File System (HDFS) can store large files across multiple machines. The hadoop system achieves reliability by replicating the data across multiple hosts, and does not require RAID storage on hosts. In some embodiments, the data collection module 804 can store up to 7-years of transaction data for multiple aliases. In some embodiments, the data collection module 804 can be implanted as part of a cloud computing system. The raw transaction data collected by the data collection module 804 is made available to the alias indexing module 806 and the alias profiling module 808 to create the linkages between various transactions and the aliases/objects that are involved in the transactions.

The alias indexing module 806 creates the links between the transactions captured by the payment processing and analysis module 802 and the various aliases/objects involved in the transactions. In some embodiments, the alias indexing module 806 outputs the information about the links between the aliases and objects to the alias caching module 810 for immediate delivery to a requesting party. For example, a consumer may buy gas at a particular gas station. The alias indexing module 806 may include information indicating a link between the person and the gas station. However, the alias indexing module 806 may not have any information about the person e.g., name, or the gas station e.g., location of the gas station. In some embodiments, the consumer and the gas station may be represented by a series of alphanumeric characters. In some embodiments, the alias indexing module 806 also stores other information relating to system security and stability. In some embodiments, the alias indexing module 806 can be part of a cloud computing system or can be implemented using customized server computers. In some embodiments, the alias indexing module 806 may have storage capacity of between 1 and 10 petabytes.

The alias profiling module 808 stores the information related to all the objects and aliases assigned to those objects. For example, the alias profiling module may include data about a person or an entity as described in relation to FIG. 4 above. The alias profiling module 808 provides this information to the alias indexing module 806 in order to enable the alias indexing module 806 to create the appropriate links based on the transaction data provided by the data collection module 804. The information in the alias profiling module 808 is continually updated based on each transaction involving an alias and/or an object. In some embodiments, the alias profiling module 808 can be implemented as a hadoop cluster with over 1 petabytes of storage capacity. In other embodiments, the alias profiling module 808 may be part of a cloud computing system. For example, as discussed above, a consumer has been purchasing gas at a particular gas station for the past 4 years. The data collection module 804 will have transaction information for all the transactions of the consumer at that gas station for the 4 years. The alias profiling module 808, however, will have information indicating that the consumer stays at location A and buys gas at gas station B. The alias indexing module 806 will include information linking the person to the gas station but will not have any information about the person or the has station.

The alias caching module 810 receives alias information from the alias indexing module 806 for delivery to the end-user via the webserver 818. In some embodiments, the alias caching module 810 stores some of the reputation and alias profile information available in the alias indexing module 806 in memory. In the instance that there is need for near real-time alias and/or reputation information to be provided to a requestor, the alias caching module 810 can immediately provide this information without the system having to query the alias indexing module 806, the alias profiling module 808, or the data collection module 804. In some embodiments, the alias caching module 810 includes a large RAM memory that holds the alias information. The alias caching module 810 can include several terabytes to up to 1 petabyte of RAM memory.

The alias batch processing module 812 is configured to perform batch processing of tasks related to one or more aliases. In some embodiments, the alias batch processing module 812 can process operations relating to the various objects/aliases. For example, the alias batch processing module 812 may perform the 'update' function described above for several objects or perform several functions for the same object concurrently. In some embodiments, the alias batch processing module 812 is coupled to the alias joining module 814 and a predictive alias module 816. The alias joining module 814 accepts input from the consumer or an external system for operations relation to an object/alias. For example, if a consumer wants to link a camera to his alias, he may fill out a registration form that came with the camera in order to register the camera in his name. In such an instance, the alias joining module 814 can receive the registration information either from the consumer or from the external system that accepts the consumer registration, e.g., a manufacturer's website. The alias joining module 814 can collect such information for various aliases and provide that information to the alias batch processing module 812 for processing. Once processed, this information is sent to the alias profiling module 808 for storage.

The predictive alias module 816 analyses the information in the alias profiling module 808 and communicates data out to various entities. For example, as described above, the system has information about a consumer buying gas at a particular gas station on Friday of every week. Using this information, the predictive alias module 816 can communicate information to the gas station informing them to expect the consumer to buy gas on the following Friday. This information could be sent to the gas station on Thursday along with some other relevant information that may enable the gas station owner to proactively provide some coupon or incentive, e.g., loyalty points, to increase the consumer's chances of buying gas at his gas station on Friday.

The webserver 818 can provide an interface to the consumers for requesting alias reputation information. In some embodiments, the webserver 818 can provide near real-time reputation information output to the requestor. In some embodiments, the reputation information can be provided by the webserver 818 using real-time technique or an in-flight technique. In the real-time method, there is direct communication between the requestor and the server providing the information. Several queries may be needed before the desired information is provided to the requestor. In the in-flight technique data is upgraded as it passes through the system without adding any additional delays to the communication time. For example, consider that person A is offering his car for sale on Craig's list and person B is interested in buying that car. In the real-time method, Person B contacts person A to tell him that he would like to see the car. Person A can then search the reputation information about person B to find out whether person B is trustworthy. In contrast, in the in-flight method, person B can communicate with person A via the system 800 that he would like to see the car. When the message is delivered to person A, it is enhanced with additional information regarding person B such as, his reputation score and any other information that may be relevant for person A to make an informed decision whether to enter into a transaction with person B. Such in-flight data transmission reduces the delay for data delivery. Details of the webserver are described in relation to FIG. 9 below.

Figure 9:
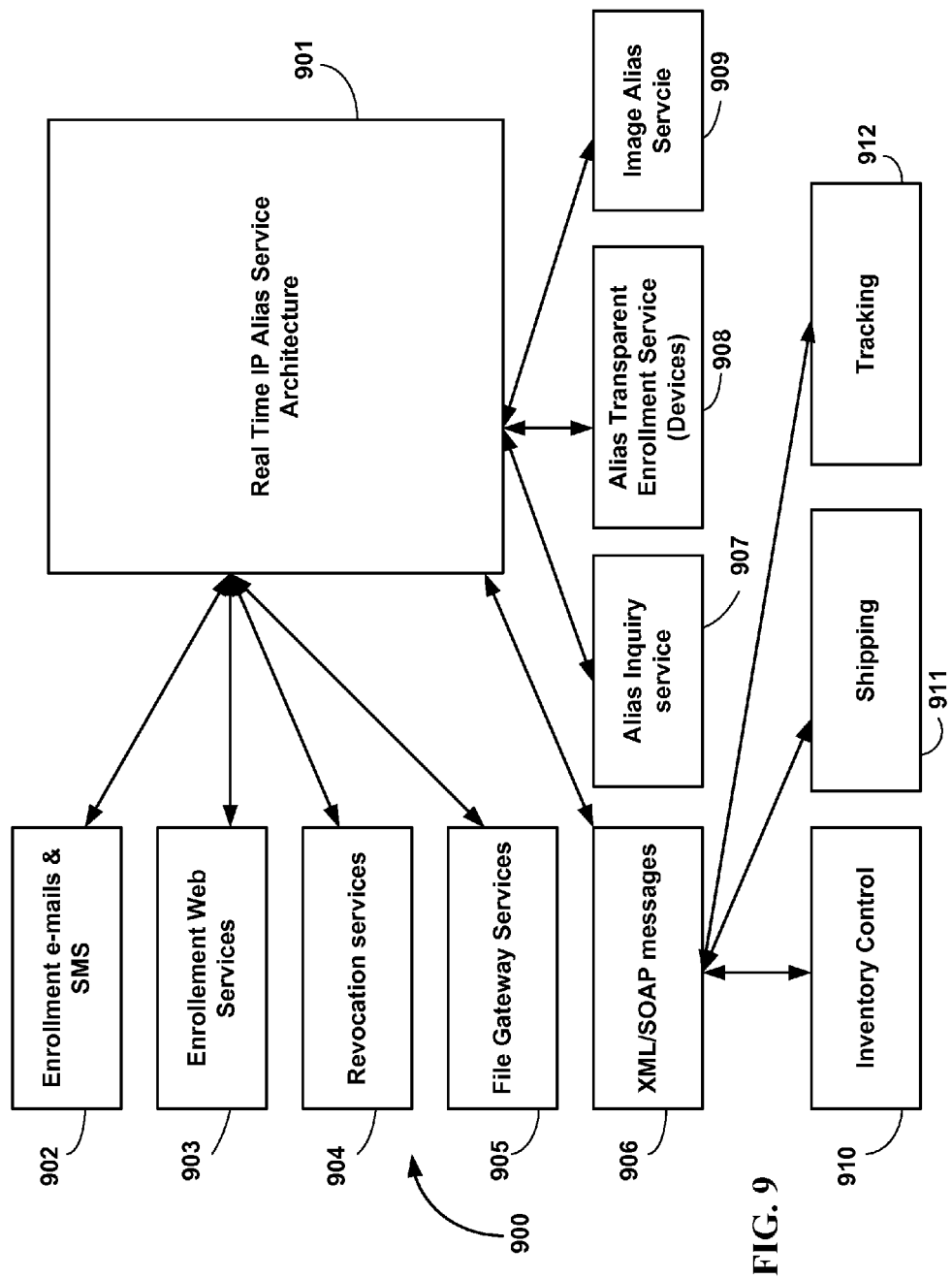
FIG. 9 is a functional block diagram of an alias identity and reputation validation system according to an embodiment of the present invention.

FIG. 9 is a functional block diagram for an alias identity and reputation system 900 according to an embodiment of the present invention.

Block 901 represents the alias service architecture that provides the various alias related services and functions described above. The alias service architecture communicates with all other functional units using one or more Internet Protocols in a real-time environment. The alias service architecture comprises a portion of system 800 described above. The alias service architecture takes inputs from various functional units and communicates results with one or more functional units.

Block 902 represents the e-mail and SMS enrollment function. In some embodiments, block 902 is implemented using a plurality of computer systems that provide e-mail and SMS capability such as, mobile phones, PDA's, and other mobile computing devices. An alias can interact with the alias service architecture via his mobile device. In some embodiments, an entity may enroll an object in or remove an object from his alias hierarchy using his mobile device using, e.g., the various maintenance functions described in relation to FIG. 5.

Block 903 represents enrollment of objects using web-based services. For example, as described above in relation to FIG. 5, an entity may perform maintenance functions on an object via web portal that provides a user interface. The entity can register via the web portal and once registered, the entity can create an alias hierarchy tree by entering information about one or more objects.

Revocation services block 904 relates to auto enrollment and disenrollment of various devices. In some embodiments, various devices, such as a mobile phone, can to auto enrolled and added to the alias hierarchy of the entity that owns the phone. For example, when a new mobile device is powered up for the first time by a user at his home, the phone may transmit certain data to the alias service identifying the phone and the user. The transmitted data may include GPS location of the phone, a serial number of the phone, a MSISDN number of the phone, among other data. The alias service may use the GPS co-ordinates of the phone to determine an address of the location and determine whether the address is associated with the user. In some embodiments, the alias service may also cross reference the phone serial number with information on the receipt issued when the phone was purchased to verify the purchaser of that phone. Based on such data, the alias service may determine that there is a high likelihood that the person who purchased the phone is the same person who is trying to activate the phone. Based on that, the phone may be auto enrolled in the alias system and linked to user's alias tree. On the other hand, if the phone is lost or stolen, the user may simple report the phone as being lost/stolen and the alias service may automatically remove the phone from the user's alias hierarchy.

File gateway services 905 may be used to request batch file transfers between the alias service and the various systems connected to the alias service. For example, file gateway services may support the Open File Delivery service (OFD) or International File Exchange Server (IFES) implemented by VISA Inc.

XML/SOAP messages system 906 provides a communication method for the alias service to interface with external systems. Specifying the communication protocol for exchanging data with the external systems eliminates the need to support multiple protocols and makes data exchange easier and faster. XML/SOAP messages system 906 may be used to communicate directly with third party entities that are not part of the alias system but nonetheless interact with the entities that are part of the alias service. For example, inventory control 910 is a service that is provided by most manufactures and distributor of goods and services that an entity may interact with. In some embodiments, the alias service may obtain such inventory data directly from a manufacturer/distributor and cross check that with the data provided by a user to make sure that the information matches. For example, a user may register his mobile device and provide a model number and serial number as part of the registration. The alias service may contact the manufacturer of that mobile phone to determine whether the serial number and model number provided by the user actually exist. This is another way of making sure that the data used to build an entity's alias hierarchy is as accurate as possible.

Shipping service 911 can also send information to the alias service. In some embodiments, the shipping information may be used to determine the destination address of an item. This information may be used to verify that the person enrolling that item is the same person who resides at that location. Tracking service 912 provides information relating to tracking of various objects associated with the alias. In some embodiments, tracking service 912 and shipping service 911 may be provided by the same entity, e.g., FedEx.

Alias inquiry service 907 may be used to query the alias service to get more information about an alias. In some embodiments, an entity may use alias inquiry service 907 to determine whether a particular alias exists and get the current status of the alias. For example, prior to conducting a transaction over the Internet, a merchant may use alias inquiry service 907 to query the alias service to determine whether the buyer's alias exists and the current status of that alias. Based on that information, the merchant can make a decision on whether to proceed with the transaction. In some embodiments, the current status of the alias may include a risk score of the alias that provides an indication of the trustworthiness of the alias. Thus, in some embodiments, alias inquiry service 907 may be used to determine whether a particular alias is trustworthy, e.g., by requesting a reputation score for the alias from the alias service.

Alias transparent enrollment service 908 provides enrollment and disenrollment for devices. In some embodiments, the enrollment and disenrollment of the devices is performed in a manner that is transparent to the user. For example, consider that device 1 is enrolled under alias 1. Consider that device 1 is then sold to alias 2. When alias 2 enrolls the device under his alias hierarchy, the alias service may automatically un-enroll device 1 from the alias hierarchy of alias 1 without the entity having alias 1 having to take any affirmative steps to un-enroll device 1. In some embodiments, alias transparent enrollment service 908 keeps track of devices/objects as they move from one alias hierarchy to another or also within the same hierarchy and update the association of the objects with the various alias hierarchies.

Image alias service 909 relates to analyzing an image to determine the authenticity of the transaction and providing that information in real-time to a payment processing system as part of the transaction approval process. For example, when a person uses an ATM machine to conduct a transaction, the ATM machine often captures the image of the person. In addition, the ATM can also gather information about the payment device being used. The image of the user, location of the ATM machine, and payment device related information can be sent to the alias service. The alias service may then analyze the image to ensure that the user is the holder of the payment device and the location of the ATM matches the known location of the user at that time. Based on this information, the alias service can determine a probability that the actual owner of the payment device is conducting that transaction. This information may be sent to a payment processing system that is processing that transaction, which can determine whether to proceed with the transaction or not based on the data received from the alias service. Thus, a potential fraudulent withdrawal can be stopped based on analyzing the image of the person attempting to make cash withdrawal. In another embodiment, a person buying a product may be imaged at the POS terminal. The image may include the person, the purchased product, the POS device, etc. This image may be analyzed to determine the alias of the person and the product he just bought. Using this information, the product may be automatically added to the alias hierarchy of that person. In yet another embodiment, an image may be analyzed to determine the metadata associated with the image. The metadata may reveal the location where the picture was taken, the type of camera used to take that picture, etc. Thus, based on the image, the alias service may determine a camera used by the user and add that camera to the person's alias hierarchy.

It is to be noted that the various services described in FIG. 9 are meant for illustrative purposes only and do not constitute an exhaustive list of services that may be used with the alias service architecture. One skilled in the art will realize that many other services may be similarly used in conjunction with the alias service architecture.

Figure 10:
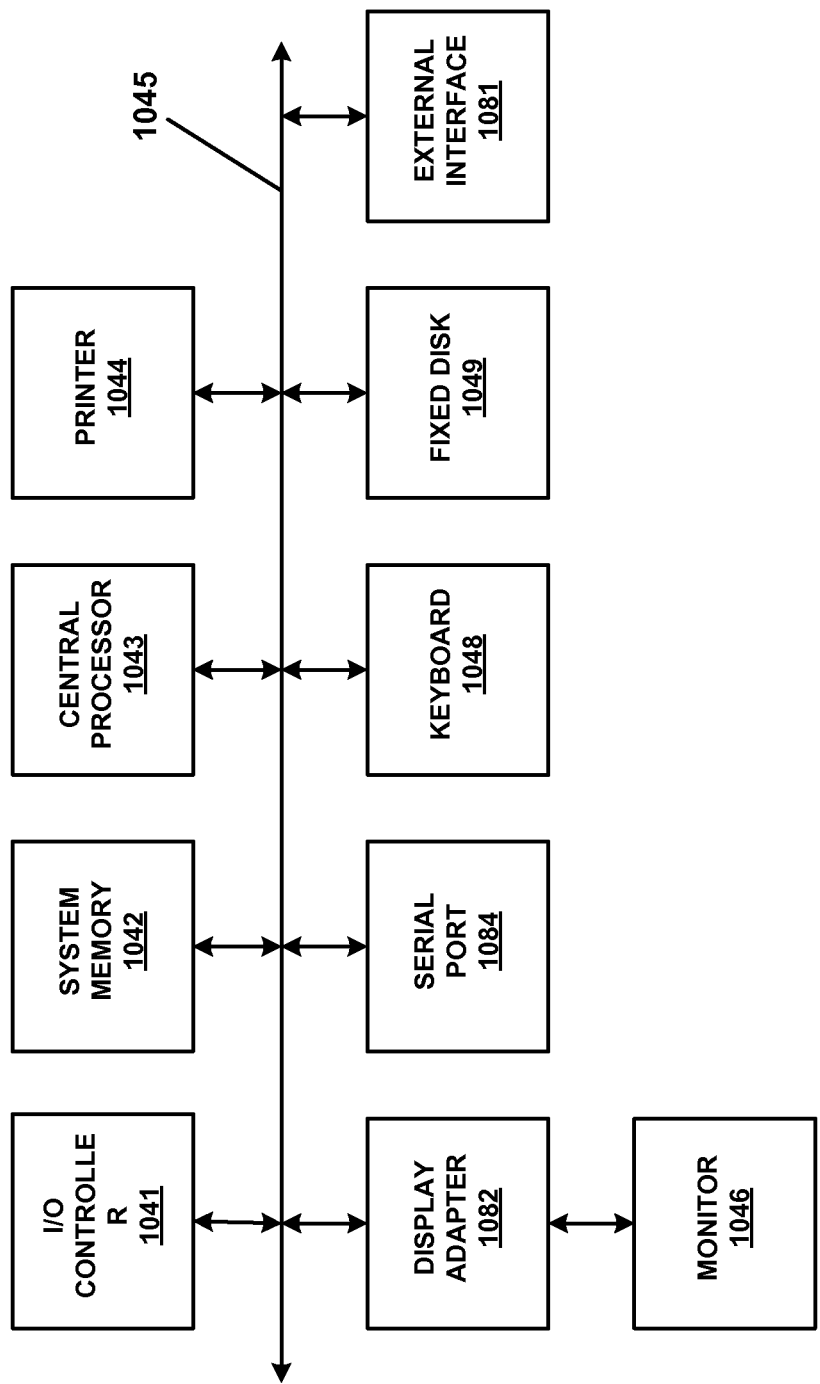
FIG. 10 is a block diagram of a computer system.

FIG. 10 is a high level block diagram of a computer system that may be used to implement any of the components of the alias server 700 described above and may include one or more of the subsystems or components shown in FIG. 10, which is a block diagram of a computer apparatus. The subsystems shown in FIG. 10 are interconnected via a system bus 1045. Additional subsystems such as printer 1044, keyboard 1048, fixed disk 1049, monitor 1046, which is coupled to display adapter 1082, and others are shown. Peripherals and input/output (I/O) devices, which couple to I/O controller 1041, can be connected to the computer system by any number of means known in the art, such as serial port 1084. For example, serial port 1084 or external interface 1081 can be used to connect the computer apparatus to a wide area network such as the Internet, a mouse input device, or a scanner. The interconnection via system bus 1045 allows central processor 1043 to communicate with each subsystem and to control the execution of instructions from system memory 1042 or fixed disk 1049, as well as the exchange of information between subsystems. The system memory 1042 and/or fixed disk 1049 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
receiving, by a reputation validation server computer, a request for providing reputation information about a first alias associated with an entity from a merchant during a transaction with the entity in a first marketplace, wherein the entity uses a payment device to conduct the transaction;
searching, by the reputation validation server computer, a database to locate reputation information for the first alias;
determining, by the reputation validation server computer, additional aliases associated with the entity;
searching, by the reputation validation server computer, for reputation information of the additional aliases;
consolidating, by the reputation validation server computer, the reputation information for the additional aliases with the reputation information for the first alias; and
providing, by the reputation validation server computer, the consolidated reputation information in the form of a reputation score to the merchant, wherein the reputation score is calculated based at least in part on a transaction risk score and non-transaction information associated with the entity, wherein the transaction risk score is determined by analyzing at least the payment device information to predict a likelihood of success of the transaction based at least in part on a history of chargebacks associated with the entity, and
wherein determining whether the entity has additional aliases includes:
receiving, by the reputation validation server computer, information about the payment device, a computer device, and a physical location associated with the entity used for the transaction, wherein the payment device includes a credit card or an account held at a financial institution and the physical location includes GPS location of the entity;
searching, by the reputation validation server computer, the database for any additional alias whose payment device information, computer device information, and physical location information matches with the entity's information; and
associating, by the reputation validation server computer, the additional alias retrieved with the entity upon matching the payment device information, the computer device information, and the physical location information of the additional alias stored in the database with the payment device information, the computer device information, and the physical location information of the entity used for the transaction,
wherein the first alias is used in the first marketplace and the additional alias is used in a second different marketplace by the entity for purchase of goods or services in the first marketplace and the second marketplace, respectively.

2. The method of claim 1 wherein the computer device information includes an Internet Protocol (IP) address of the computer device, hardware configuration information of the computer device, and information about applications installed on the computer device.

3. The method of claim 1 wherein providing the reputation score includes providing a link for accessing the reputation score.

4. The method of claim 1, wherein the non-transaction information includes the computer device information and the physical location information associated with the entity.

5. The method of claim 1, wherein the transaction risk score indicates a risk associated with the transaction.

6. The method of claim 1, wherein the transaction risk score is further determined by analyzing a prior history associated with the entity.

7. A non-transitory computer- readable storage medium including instructions which when executed by a processor embedded in a computer system cause the processor to perform a method comprising:
receiving a request for providing reputation information about a first alias associated with an entity from a merchant during a transaction with the entity in a first marketplace, wherein the entity uses a payment device to conduct the transaction;
searching a database to locate reputation information for the first alias;
determining additional aliases associated with the entity;
searching for reputation information of the additional aliases;
consolidating the reputation information for the additional aliases with the reputation information for the first alias; and
providing the consolidated reputation information in the form of a reputation score to the merchant, wherein the reputation score is calculated based at least in part on a transaction risk score and non-transaction information associated with the entity, wherein the transaction risk score is determined by analyzing at least the payment device information to predict a likelihood of success of the transaction based at least in part on a history of chargebacks associated with the entity, and
wherein determining whether the entity has additional aliases includes:
receiving information about the payment device, a computer device, and a physical location associated with the entity used for the transaction, wherein the payment device includes a credit card or an account held at a financial institution and the physical location includes GPS location of the entity;
searching the database for any additional alias whose payment device information, computer device information, and physical location information matches with the entity's information; and
associating the additional alias retrieved with the entity upon matching the payment device information, the computer device information, and the physical location information of the additional alias stored in the database with the payment device information, the computer device information, and the physical location information of the entity used for the transaction,
wherein the first alias is used in the first marketplace and the additional alias is used in a second different marketplace by the entity for purchase of goods or services in the first marketplace and the second marketplace, respectively.

8. The computer-readable storage medium of claim 7 wherein the computer device information includes an Internet Protocol (IP) address of the computer device, hardware configuration information of the computer device, and information about applications installed on the computer device.

9. The computer-readable storage medium of claim 7 wherein providing the reputation score includes providing a link for accessing the reputation score.

10. A reputation validation server computer comprising:
a processor;
a memory storing a database and coupled to the processor; and
a network interface coupled to the processor and configured to communicate receive data from and send data to an external system,
wherein the processor is configured to:
receive a request for providing reputation information about a first alias associated with an entity from a merchant during a transaction with the entity in a first marketplace, wherein the entity uses a payment device to conduct the transaction;
search the database to locate reputation information for the first alias;
determine additional aliases associated with the entity;
search for reputation information of the additional aliases;
consolidate the reputation information for the additional aliases with the reputation information for the first alias; and
provide the consolidated reputation information in the form of a reputation score to the merchant, wherein the reputation score is calculated based at least in part on a transaction risk score and non-transaction information associated with the entity, wherein the transaction risk score is determined by analyzing at least the payment device information to predict a likelihood of success of the transaction based at least in part on a history of chargebacks associated with the entity, and
wherein to determine whether the entity has additional aliases, the processor is further configured to:
receive information about the payment device, a computer device, and a physical location associated with the entity used for the transaction, wherein the payment device includes a credit card or an account held at a financial institution and the physical location includes GPS location of the entity;
search the database for any additional alias whose payment device information, computer device information, and physical location information matches with the entity's information; and
associate the additional alias retrieved with the entity upon matching the payment device information, the computer device information, and the physical location information of the additional alias stored in the database with the payment device information, the computer device information, and the physical location information of the entity used for the transaction,
wherein the first alias is used in the first marketplace and the additional alias is used in a second marketplace by the entity for purchase of goods or services in the first marketplace and the second marketplace, respectively.

11. The reputation validation server computer of claim 10 wherein the computer device information includes an Internet Protocol (IP) address of the computer device, hardware configuration information of the computer device, and information about applications installed on the computer device.

12. The reputation validation server computer of claim 10 wherein to provide the reputation score, the processor is further configured to provide a link for accessing the reputation score.

13. A system comprising:
a reputation validation server computer comprising a processor,
a memory storing a database and coupled to the processor, and
a network interface coupled to the processor and configured to communicate receive data from and send data to an external system,
wherein the processor is configured to
receive a request for providing reputation information about a first alias associated with an entity from a merchant computer during a transaction with the entity coupled to a client computer in a first marketplace, wherein the entity uses a payment device to conduct the transaction,
search the database to locate reputation information for the first alias,
determine additional aliases associated with the entity,
search for reputation information of the additional aliases;
consolidate the reputation information for the additional aliases with the reputation information for the first alias; and
provide the consolidated reputation information in the form of a reputation score, wherein the reputation score is calculated based at least in part on a transaction risk score and non-transaction information associated with the entity, wherein the transaction risk score is determined by analyzing at least the payment device information to predict a likelihood of success of the transaction based at least in part on a history of chargebacks associated with the entity, and
wherein to determine whether the entity has additional aliases, the processor is further configured to
receive information about the payment device, a computer device, and a physical location associated with the entity used for the transaction, wherein the payment device includes a credit card or an account held at a financial institution and the physical location includes GPS location of the entity,
search the database for any additional alias whose payment device information, computer device information, and physical location information matches with the entity's information; and
associate the additional alias retrieved with the entity upon matching the payment device information, the computer device information, and the physical location information of the additional alias stored in the database with the payment device information, the computer device information, and the physical location information of the entity used for the transaction,
wherein the first alias is used in the first marketplace and the additional alias is used in a second different marketplace by the entity for purchase of goods or services in the first marketplace and the second marketplace, respectively; and
the client computer and the merchant computer in communication with the reputation validation server computer, the merchant computer configured to provide the request and receive the reputation score.

* * * * *

UNITED STATES PATENT AND TRADEMARK OFFICE
CERTIFICATE OF CORRECTION

PATENT NO. : 8,818,882 B2
APPLICATION NO. : 12/846769
DATED : August 26, 2014
INVENTOR(S) : Mark Carlson et al.

It is certified that error appears in the above-identified patent and that said Letters Patent is hereby corrected as shown below:

In the Claims

In claim 7, column 27, line 20, delete "computer- readable" and insert --computer-readable--;
In claim 10, column 28, line 17, after "communicate" insert --with,--;
In claim 13, column 29, line 13, after "communicate" insert --with,--.

Signed and Sealed this
Ninth Day of June, 2015

Michelle K. Lee
*Director of the United States Patent and Trademark Office*